United States Patent
Nicol et al.

(10) Patent No.: US 10,191,657 B2
(45) Date of Patent: Jan. 29, 2019

(54) COMPRESSION-BASED DETECTION OF MEMORY INEFFICIENCY IN SOFTWARE PROGRAMS

(71) Applicant: LinkedIn Corporation, Mountain View, CA (US)

(72) Inventors: John W. Nicol, San Jose, CA (US); Cuong H. Tran, Los Altos, CA (US); Haricharan K. Ramachandra, Fremont, CA (US); Badrinath K. Sridharan, Saratoga, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 451 days.

(21) Appl. No.: 14/970,373

(22) Filed: Dec. 15, 2015

(65) Prior Publication Data
US 2017/0168726 A1    Jun. 15, 2017

(51) Int. Cl.
| | | |
|---|---|---|
| G06F 17/30 | (2006.01) | |
| G06F 3/06 | (2006.01) | |
| G06F 11/36 | (2006.01) | |
| G06F 8/00 | (2018.01) | |
| G06F 11/30 | (2006.01) | |
| G06F 11/34 | (2006.01) | |

(52) U.S. Cl.
CPC ............ *G06F 3/0608* (2013.01); *G06F 3/065* (2013.01); *G06F 3/067* (2013.01); *G06F 3/0619* (2013.01); *G06F 8/00* (2013.01); *G06F 11/3037* (2013.01); *G06F 11/36* (2013.01); *G06F 11/3409* (2013.01)

(58) Field of Classification Search
CPC ....................................................... G06F 17/30

USPC ................................................. 707/693, 813
See application file for complete search history.

(56) References Cited

U.S. PATENT DOCUMENTS 5,617,552 A * 4/1997 Garber .................. G06F 12/023
 341/51
5,699,539 A * 12/1997 Garber .................. G06F 12/023
 360/8

(Continued)

FOREIGN PATENT DOCUMENTS

WO    WO-2014029425 A1 *    2/2014   ............. H03M 7/30

OTHER PUBLICATIONS

Memory Analyzer (MAT), Copyright 2016 The Eclipse Foundation, https://eclipse.org.mat/.

(Continued)

*Primary Examiner* — Kim T Nguyen
(74) *Attorney, Agent, or Firm* — Park, Vaughan, Fleming & Dowler LLC; Chia-Hsin Suen

(57) ABSTRACT

The disclosed embodiments provide a system for detecting and managing memory inefficiency in a software program. During operation, the system obtains a first snapshot of a heap for a software program, wherein the first snapshot includes a first set of objects stored in the heap at a first time. Next, the system applies a compression technique to the first snapshot to obtain a first set of inefficiency metrics for the first set of objects, wherein each inefficiency metric in the first set of inefficiency metrics represents a memory inefficiency of an object in the heap at the first time. The system then outputs the first set of inefficiency metrics with additional attributes of the first set of objects to improve identification of the memory inefficiency in the software program.

20 Claims, 5 Drawing Sheets

(56) References Cited

U.S. PATENT DOCUMENTS

| | | | |
|---|---|---|---|
| 6,546,705 B2* | 4/2003 | Scarlett | A01F 15/00 56/10.2 R |
| 7,779,054 B1 | 8/2010 | Printezis | |
| 8,880,836 B2* | 11/2014 | Owa | G06F 12/0246 710/68 |
| 9,715,346 B2 | 7/2017 | Jain | |
| 2011/0145486 A1* | 6/2011 | Owa | G06F 12/0246 711/103 |
| 2014/0064479 A1 | 3/2014 | Manikandan | |
| 2014/0279874 A1 | 9/2014 | Reiter | |
| 2015/0066881 A1* | 3/2015 | Sundaram | H04L 43/062 707/693 |
| 2015/0356137 A1* | 12/2015 | Andros | G06F 17/30442 707/715 |
| 2016/0224424 A1 | 8/2016 | Kahler | |
| 2017/0003899 A1 | 1/2017 | Raja | |

OTHER PUBLICATIONS

"In-depth .NET Memory Profiling", Copyright 2001-2016 SciTech Software AB, http://memprofiler.com.

Jennifer B. Sartor et al., "No Bit Left Behind: The Limits of Heap Data Compression", ISMM'08, Jun. 7-8, Tucson, AZ, Copyright 2008 ACM.

* cited by examiner

COMPRESSION-BASED DETECTION OF MEMORY INEFFICIENCY IN SOFTWARE PROGRAMS

BACKGROUND

Field

The disclosed embodiments relate to improving memory usage in software programs. More specifically, the disclosed embodiments relate to techniques for performing compression-based detection of memory inefficiency in software programs.

Related Art

Developers of software programs are frequently unaware of how data structures and/or objects in the software programs consume memory. As a result, the developers may create or consume (e.g., via libraries) objects and/or data structures that result in sub-optimal execution and/or memory inefficiencies in the software programs. For example, a developer may declare a data structure with multiple elements, such as an "ArrayList" object. As the number of elements in the data structure increases, the size of the data structure may double. As a result, the data structure may consume significantly more memory than required to store the used elements in the data structure, which in turn may negatively impact the performance and memory usage of the software program containing the data structure.

Consequently, the execution of software programs may be facilitated by mechanisms for detecting and managing memory inefficiency in the software programs.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
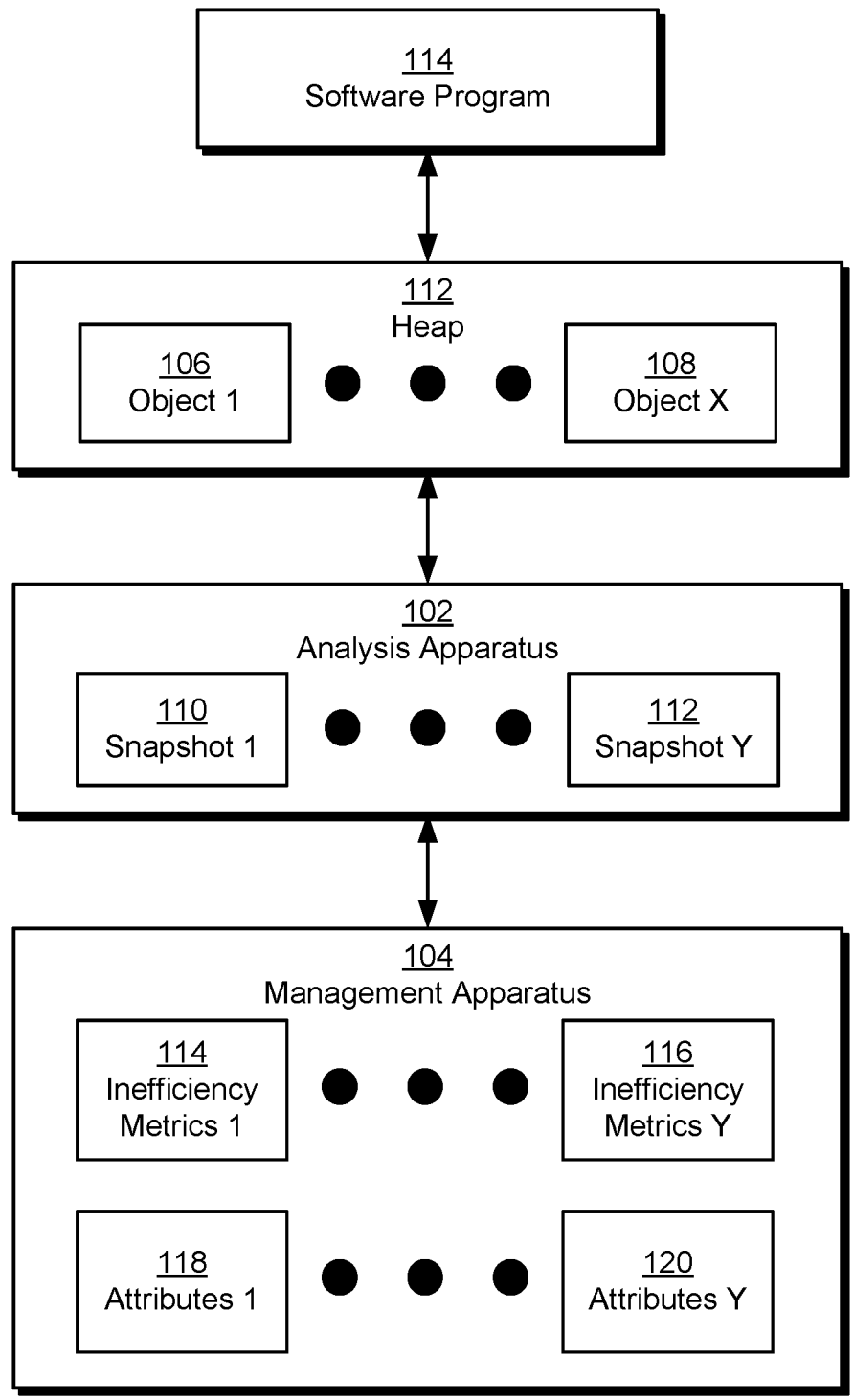
FIG. 1 shows a schematic of a system in accordance with the disclosed embodiments.

The disclosed embodiments provide a method, apparatus, and system for detecting and managing memory inefficiency in software programs. As shown in FIG. 1, a software program 114 may execute using memory from a heap 112. For example, software program 114 may be an operating system, virtual machine, database, middleware, native application, web application, and/or other type of software that executes using objects (e.g., object 1 106, object x 108) of arbitrary size and length. Memory for new objects may be allocated from heap 112 by a memory allocator, and memory from unused objects in heap 112 may be reclaimed by a garbage collector.

Those skilled in the art will appreciate that dynamic memory allocation from heap 112 to software program 114 may be associated with significant memory inefficiency and/or memory issues for a number of programming languages that are designed for ease of use instead of memory efficiency. The memory issues may include memory bloat, in which excessive memory is allocated but not freed in heap 112. For example, memory bloat may be caused by the allocation of space for more elements in data structures such as ArrayLists and hash maps than is used by the data structures, as well as significant increases (e.g., 150-200%) in the size of the data structures to accommodate growth in the number of elements beyond previously allocated sizes. In another example, memory bloat may be caused by the wrapping of primitive types such as integers and strings in class-based objects that are multiple times larger than the primitive types, such as Integers.

The memory issues may also include memory churn, in which excessive memory is regularly allocated and freed from heap 112. For example, memory churn may be caused by alternating between allocation and use of a large number of objects in heap 112 and deallocation and garbage collection of those objects. Such repeated allocation and deallocation of large amounts of memory may trigger multiple garbage-collection cycles and slow the execution of software program 114.

The memory inefficiency may further include a memory leak, in which incremental amounts of memory are allocated but not freed. For example, a memory leak may be caused by an increase in the number of objects in heap 112 that are reachable but unused and/or the expansion of array-based data structures by a multiple of their previous size. A memory leak that is not resolved may further lead to an out-of-memory (OOM) error and/or failure in software program 114.

At the same time, a developer of software program 114 may have difficulty detecting memory inefficiency in software program 114 and/or identifying sources of the memory inefficiency. For example, the developer may use a memory visualizer to view the structure and/or organization of objects in heap 112. However, the memory visualizer may be unable to provide information that can be used to identify objects that are inefficiently using memory and/or may be unable to track changes in the memory usage of software program 114 over time.

In one or more embodiments, the system of FIG. 1 includes functionality to detect and manage memory inefficiency in software program 114. First, an analysis apparatus 102 may obtain a series of snapshots (e.g., snapshot 1 110, snapshot y 112) of heap 112. Each snapshot may include a set of objects from software program 114 that are stored in heap 112 at a given time. For example, analysis apparatus 102 may obtain the snapshot at periodic intervals and/or after certain events (e.g., garbage collection cycles, memory allocation, etc.) have occurred from a tool, garbage collector, and/or execution environment for software program 114.

Next, analysis apparatus 102 may use one or more compression techniques to generate a set of inefficiency metrics (e.g., inefficiency metrics 1 114, inefficiency metrics y 116) for objects in each snapshot. For example, analysis apparatus 102 may compress one or more portions of the snapshot using Huffman coding, Lempel-Ziv, arithmetic coding, bzip2, some other compression technique, and/or a combination of compression techniques. The portions may include the entire snapshot, individual objects in the snapshot, and/or groupings of objects in the snapshot. After a portion is compressed, analysis apparatus 102 may generate an inefficiency metric representing the redundancy, compression ratio, and/or other measure of memory inefficiency in the portion from the compressed and uncompressed sizes of the portion. As a result, the inefficiency metric may be an indication and/or upper bound of the amount of memory that can be saved through more efficient implementation or use of objects in the portion.

After the inefficiency metrics are generated for a given snapshot, a management apparatus 104 may output the inefficiency metrics with additional attributes (e.g., attributes 1 118, attributes y 120) of the corresponding portions to improve identification of memory inefficiency in software program 114. For example, management apparatus 104 may display a ranking of objects in the snapshot by decreasing order of memory inefficiency, as determined using the inefficiency metrics. Management apparatus 104 may also display the class names, uncompressed sizes, compressed sizes, numbers of instances, fields, types, and/or values associated with objects or portions of the snapshot in the ranking. Management apparatus 104 may further identify a subset of objects in the snapshot as candidates for improving memory inefficiency in software program 114.

Analysis apparatus 102 and management apparatus 104 may additionally include functionality to analyze and manage memory-usage trends, patterns, and/or issues in software program 114. As described in further detail below with respect to FIG. 2, such analysis may be performed by comparing inefficiency metrics across snapshots, matching the snapshots and inefficiency metrics to the memory-usage patterns, and/or using the inefficiency metrics to match objects in one snapshot with objects in another snapshot. In turn, analysis apparatus 102 and management apparatus 104 may identify memory leaks, OOM errors, and/or other memory issues associated with the trends; identify potential causes of the trends and/or issues; and/or generate recommendations for reducing memory inefficiency in software program 114 based on the memory-usage patterns. Consequently, the system of FIG. 1 may automatically detect memory inefficiencies, identify the sources of the memory inefficiencies, determine potential causes of memory issues, and suggest or implement mechanisms for mitigating the memory inefficiencies and/or issues.

Figure 2:
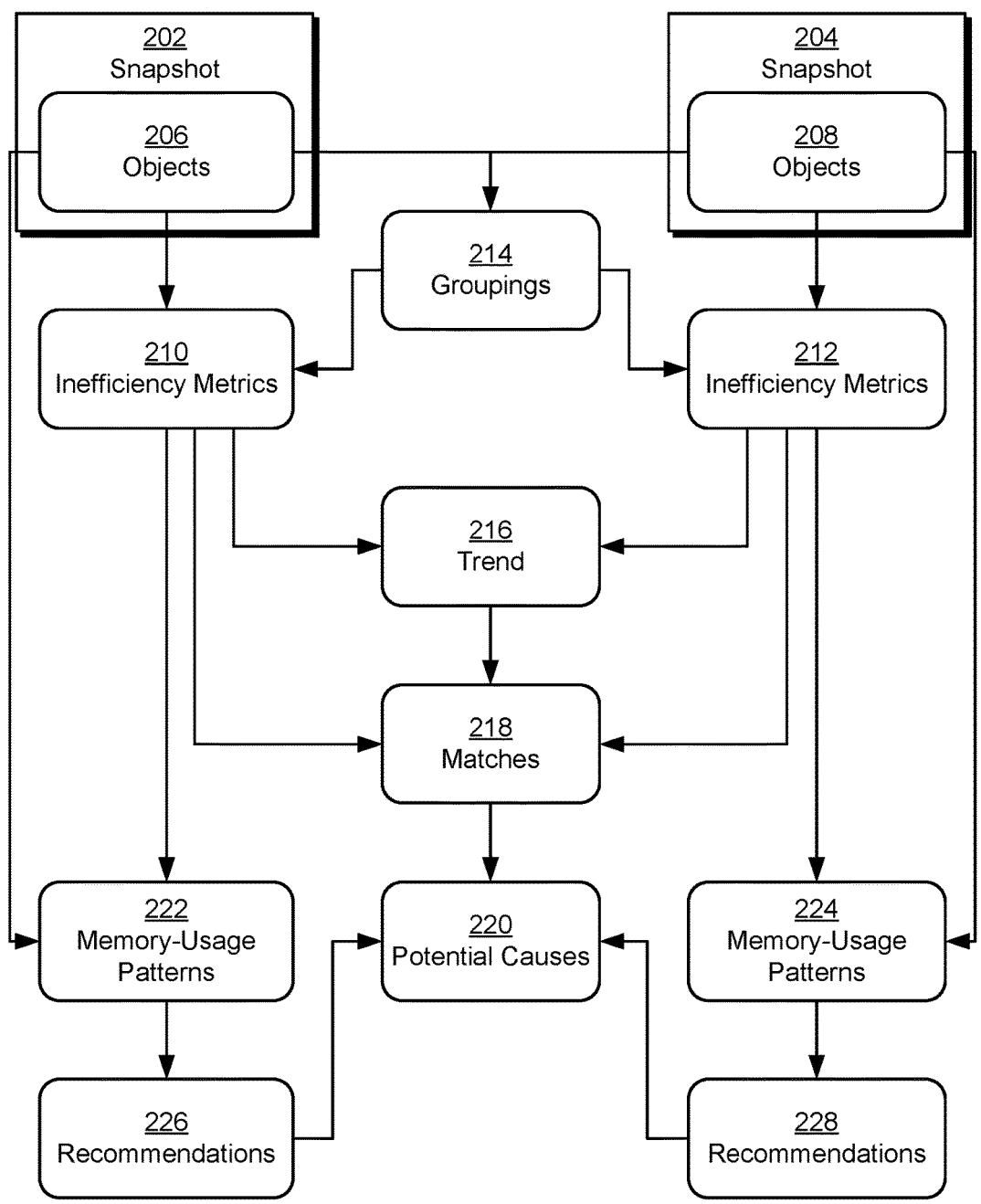
FIG. 2 shows the detection and management of memory inefficiency in a software program in accordance with the disclosed embodiments.

FIG. 2 shows the detection and management of memory inefficiency in a software program (e.g., software program 114 of FIG. 1) in accordance with the disclosed embodiments. The operations illustrated in FIG. 2 may be performed by one or more components of a memory-management system, such as analysis apparatus 102 and/or management apparatus 104 of FIG. 1.

As shown in FIG. 2, memory inefficiency in the software program may be detected by analyzing snapshots 202-204 of a heap for the software program, such as heap 112 of FIG. 1. Each snapshot 202-204 may include a set of objects 206-208 that are stored in the heap at a given time. For example, snapshot 202 may include a first set of objects 206 that are found in the heap at a first time, and snapshot 204 may include a second set of objects 208 that are fond in the heap at a second, later time.

A set of inefficiency metrics 210-212 may be generated from each snapshot 202-204 after the snapshot is created. Inefficiency metrics 210-212 may represent measures of memory inefficiency in the corresponding objects 206-208. To generate inefficiency metrics 210-212, each object may be compressed using one or more compression techniques, and the corresponding inefficiency metric may be calculated as a redundancy, compression ratio, and/or other value from the compressed and uncompressed sizes of the object.

Additional inefficiency metrics 210-212 may also be produced for one or more groupings 214 of objects 206-208 in each snapshot 202-204. Groupings 214 may be generated based on attributes of objects 206-208 and/or snapshots 202-204. For example, groupings 214 may include all objects 206-208 in a given snapshot, objects of a certain type, objects that match a certain containment relationship (e.g., all objects that are contained by the same object and/or all objects at the same level of a containment hierarchy for the software program), and/or objects of a certain size or range of sizes.

To calculate an inefficiency metric for a given grouping of objects, all objects in the grouping may be aggregated and compressed, and the inefficiency metric may be calculated from the compressed and uncompressed sizes of the aggregated objects. For example, a redundancy of all Integer objects in snapshot 202 may be calculated by summing the uncompressed sizes of the Integer objects, compressing the entire set of Integer objects, and dividing the compressed size of the set of Integer objects by the sum of the uncompressed sizes.

After inefficiency metrics 210-212 are calculated for objects 206-208 and groupings 214 in snapshots 202-204, the inefficiency metrics may be outputted with additional attributes of the corresponding objects and/or groupings. For example, the objects and/or groupings may be ranked in descending order of redundancy. Each item in the ranking may also be displayed with attributes such as one or more class names, a number of object instances, a compressed size, and/or an uncompressed size of the item. The item may also be displayed with field names, field types, and/or field values of fields in the item to enable identification of subsets and/or groupings 214 of objects 206-208 that may contribute to memory inefficiency in the software program. A number of items in the ranking (e.g., a pre-specified number of items with the highest inefficiency metrics and/or all items with inefficiency metrics that are higher than a threshold) may additionally be flagged as candidates for improving memory inefficiency in the software program.

Objects 206-208 and inefficiency metrics 210 for each snapshot 202-204 may also be matched to one or more memory-usage patterns 222-224, and recommendations 226-228 for reducing the memory inefficiency of the software program may be outputted based on the memory-usage patterns. For example, a high redundancy of an object and a type of the object (e.g., ArrayList of Integers) may be matched to a memory-usage pattern that indicates inefficient use of memory that is caused by one or more types from which the object is instantiated. In turn, a recommendation for reducing the object's memory usage may include changing the type(s) used to instantiate the object to primitive types and/or more efficient data structures.

Inefficiency metrics 210-212 generated from snapshots 202-204 may also be compared to identify a trend 216 associated with memory usage in the heap. For example, inefficiency metrics 210-212 for different snapshots 202-204 of the heap may be used to identify changes in memory usage and/or memory inefficiency for specific objects 206-208, groupings 214 of objects, and/or other portions of the heap over time. A developer may also use comparisons of inefficiency metrics 210-212 to determine if memory inefficiency in the software program is increasing over time and/or if implementation of actions in recommendations 226 or 228 has improved the memory usage of the software program.

Changes in inefficiency metrics 210-212 and/or associated values (e.g., compressed and uncompressed sizes) across a series of snapshots, or trend 216, may further be used to detect memory issues such as memory bloat, memory churn, and/or a memory leak. For example, memory bloat may be detected as a sustained inefficient use of memory in the heap, as represented by a sequence of high values of redundancy (e.g., more than 80%) in inefficiency metrics 210-212. Memory churn may be detected as cyclical increases and decreases in the memory usage and/or memory inefficiency of the software program, as represented by fluctuating values of heap size and/or inefficiency metrics 210-212 over time. A memory leak may be detected as a sequence of gradual increases in memory usage and/or memory inefficiency, as represented by corresponding increases in heap size and/or inefficiency metrics 210-212 over time.

To identify a potential cause of trend 216 and/or memory issues represented by trend 216, inefficiency metrics 210-212 may be used to identify matches 218 between objects 206-208 in consecutive snapshots 202-204, and matches 218 may be used to identify one or more potential causes 220. More specifically, inefficiency metrics 210-212 may serve as "compression signatures" for the corresponding objects 206-208 or groupings 214 of objects. As a result, objects with similar compression signatures (e.g., values of inefficiency metrics 210-212) may be instantiated from the same class and/or from different classes with similar memory-usage patterns (e.g., memory-usage patterns 222-224). The compression signatures may be tracked and compared across snapshots 202-204 to determine the "contribution" of different types of objects to the overall redundancy or memory usage of the heap. In turn, objects with compression signatures that approach and/or track the compression signature of the heap may be identified as potential causes 220 of trend 216 and/or memory issues represented by trend 216.

For example, snapshot 204 may be taken after an OOM error is encountered by the software program, and snapshot 202 may be taken prior to snapshot 204. Inefficiency metrics 210 for snapshot 202 may indicate a redundancy of 60% for the heap, a few hundred objects with 66% redundancy, and a number of other objects with other redundancies. Inefficiency metrics 212 for snapshot 204 may indicate a redundancy of close to 66% for the heap, a few hundred thousand objects with 66% redundancy, and a much smaller number of objects with other redundancies. Because the final redundancy of the heap at snapshot 204 is highly similar to the redundancy of a majority of objects in snapshot 204, some or all of the objects with similar redundancies to the heap may be identified with a large measure of confidence as potential causes of the OOM error. Moreover, a rapid growth in the number of objects with 66% redundancy between snapshots 202-204 may indicate that replication of objects with "compression signatures" represented by 66% redundancy is likely responsible for a memory leak that caused the OOM error.

As with inefficiency metrics 210-212 and recommendations 226-228, trend 216, matches 218, and/or potential cause 220 may be outputted to improve identification and/or management of memory inefficiency in the software program. For example, an indication of an upward trend 216 in memory consumption and inefficiency may be displayed with a list of objects with inefficiency metrics 210-212 that track trend 216 and are thus potential causes of trend 216. A developer may use the list and/or one or more recommendations 226-228 associated with objects in the list to refactor the software program in a way that reduces the memory consumption and inefficiency. In turn, the developer may resolve and/or avert a memory issue represented by trend 216, such as memory bloat and/or a memory leak in the software program.

Figure 3:
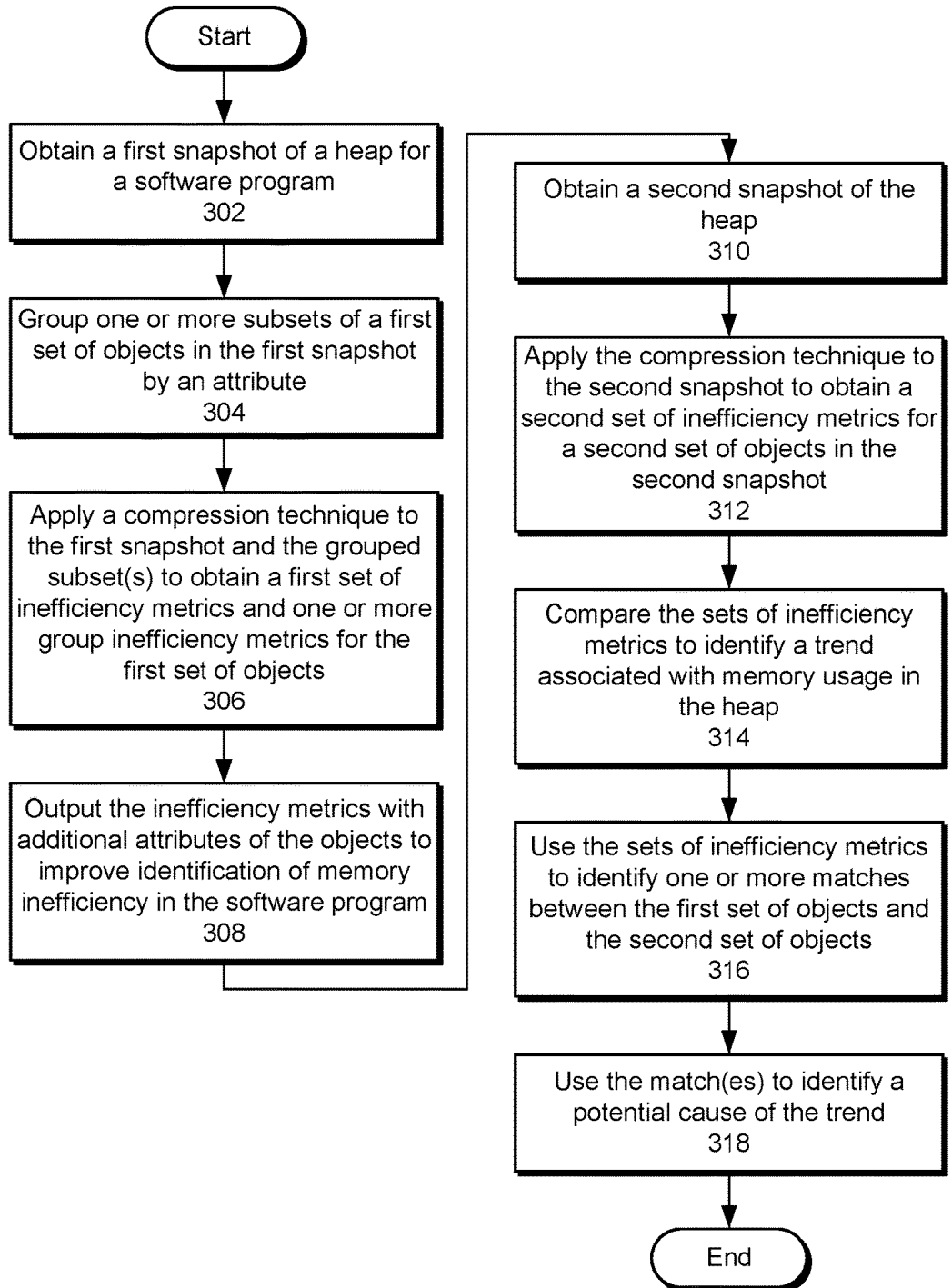
FIG. 3 shows a flowchart illustrating the process of detecting memory inefficiency in a software program in accordance with the disclosed embodiments.

FIG. 3 shows a flowchart illustrating the process of detecting memory inefficiency in a software program in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a first snapshot of a heap for a software program is obtained (operation 302). For example, the first snapshot may be obtained from a tool, execution environment, and/or garbage collector for the software program. The first snapshot may be obtained after an event has occurred during execution of the software program, or the first snapshot may be obtained after a fixed interval has passed since the previous snapshot.

Next, one or more subsets of a first set of objects in the first snapshot are grouped by an attribute (operation 304). For example, the subset(s) may be grouped by a type, such as the class from which the objects were instantiated. The subset(s) may also be grouped by a containment relationship, such as all objects indirectly or directly contained within a parent object and/or all objects in a given level of a containment hierarchy (e.g., all objects declared as fields under a parent object) for the software program. The subset(s) may further be grouped by the sizes and/or ranges of sizes of objects in the snapshot.

A compression technique is then applied to the first snapshot and the grouped subset(s) to obtain a first set of inefficiency metrics and possibly one or more group inefficiency metrics for the first set of objects (operation 306). For example, the compression technique may be used to compress individual objects, groups of objects, portions of the heap, and/or the entire heap. The corresponding inefficiency metrics may be calculated by dividing the compressed sizes of the objects, groups, portions, and/or heap by the uncompressed sizes. As a result, the inefficiency metrics may represent redundancies of various subsets of the heap.

The calculated inefficiency metrics may also be used to perform one or more additional groupings of the objects, which in turn are used to calculate additional group inefficiency metrics. For example, one or more subsets of the objects may be grouped by values and/or ranges of values of the inefficiency metric, and additional group inefficiency metrics may be calculated for the grouped subsets. The group inefficiency metrics may provide an indication of the amount of "duplication" in the grouped objects, in that a grouped inefficiency metric that is similar to individual inefficiency metrics of objects in the corresponding group may indicate that objects in the group and/or classes used to instantiate the objects have similar memory-usage patterns.

The calculated inefficiency metrics are outputted with additional attributes of the objects to improve identification of memory inefficiency in the software program (operation 308). For example, a ranking of the first set of objects and/or groupings may be displayed in decreasing order of memory inefficiency, along with class name, uncompressed sizes, compressed sizes, numbers of object instances, fields, types, and/or values associated with the corresponding objects or groupings. A subset of the first set of objects as candidates for improving memory inefficiency may also be identified and/or flagged within the ranking. The ranking may also be sorted by the other attributes, searched for keyword matches, and/or filtered.

A second snapshot of the heap is also obtained (operation 310) sometime after the first snapshot. For example, the second snapshot may be obtained at a fixed interval after the first snapshot, or the second snapshot may be triggered by an event that occurs after the first snapshot.

Next, the compression technique is applied to the second snapshot to obtain a second set of inefficiency metrics for a second set of objects in the second snapshot (operation 312). As with generation of the first set of efficiency metrics, the second set of inefficiency metrics may include one or more group inefficiency metrics for one or more groupings of the second set of objects by type, containment relationship, size, inefficiency metric, and/or another attribute.

The two sets of inefficiency metrics are then compared to identify a trend associated with memory usage in the heap (operation 314). For example, the two sets of inefficiency metrics may be used to analyze patterns in the overall memory usage of the heap, as well as subsets of objects that may contribute to the patterns.

The two sets of inefficiency metrics are also used to identify one or more matches between the first and second sets of objects (operation 316), and the match(es) are used to identify a potential cause of the trend (operation 318). For example, inefficiency metrics in the first set of objects may be matched to similar inefficiency metrics in the second set of objects, and a change in the overall inefficiency metric for the heap may be analyzed with respect to the matched objects. In turn, changes in the numbers of objects with inefficiency metrics that track the overall inefficiency metric may be used to identify objects that are likely to contribute to a memory issue represented by the change in the overall inefficiency metric.

Figure 4:
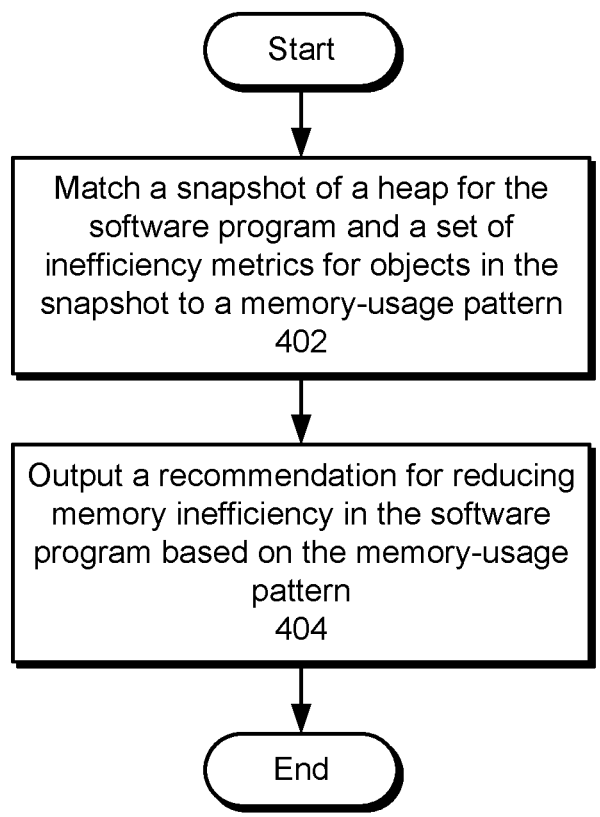
FIG. 4 shows a flowchart illustrating the process of managing memory inefficiency in a software program in accordance with the disclosed embodiments.

FIG. 4 shows a flowchart illustrating the process of managing memory inefficiency in a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a snapshot of a heap for the software program and a set of inefficiency metrics for objects in the snapshot are matched to a memory-usage pattern (operation 402). For example, the snapshot may be used to identify classes from which the objects were instantiated, and the class names and inefficiency metrics may be matched to known patterns of inefficient memory use in the software program, such as instantiation of array-backed data structures with elements that are primitive types wrapped in class-based objects.

Next, a recommendation for reducing memory inefficiency in the software program is outputted based on the memory-usage pattern (operation 404). Continuing with the above example, the recommendation may specify substitution of the class-based objects with the primitive types and use of a different data structure in lieu of the array-backed data structures. As another example, the recommendation may recommend caching of an object that is duplicated multiple times to avert redundant storage of the object in memory.

Figure 5:
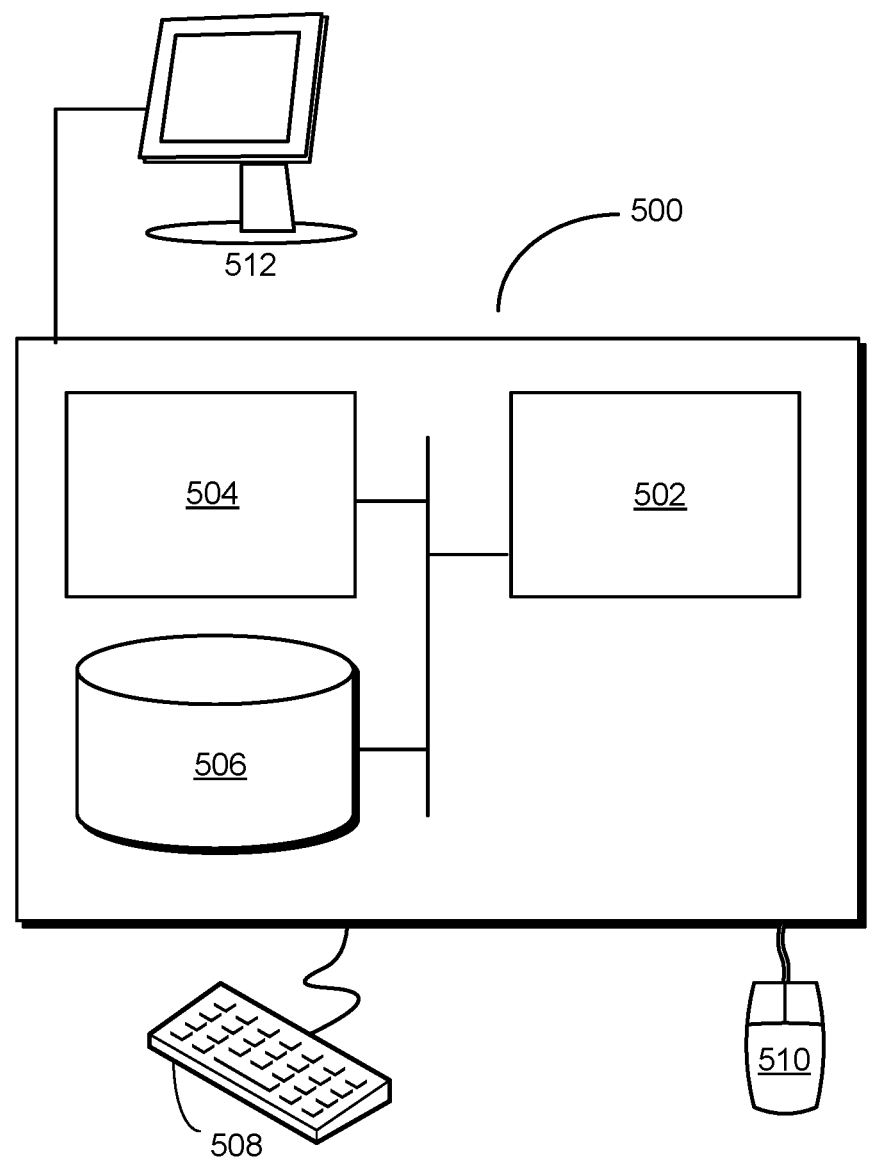
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for detecting and managing memory inefficiency in a software program. The system may include an analysis apparatus that obtains a first snapshot of a heap for a software program. The first snapshot may include a first set of objects stored in the heap at a first time. Next, the analysis apparatus may apply a compression technique to the first snapshot to obtain a first set of inefficiency metrics for the first set of objects. Each inefficiency metric in the first set of inefficiency metrics may represent a memory inefficiency of an object (or a group of objects) in the heap at the first time. The system may also include a management apparatus that outputs the first set of inefficiency metrics with additional attributes of the first set of objects to improve identification of the memory inefficiency in the software program.

The analysis apparatus may also obtain a second snapshot of the heap that includes a second set of objects stored in the heap at a second time. Next, the analysis apparatus may apply the compression technique to the second snapshot to obtain a second set of inefficiency metrics for the second set of objects. The analysis apparatus may then compare the first and second sets of inefficiency metrics to identify a trend associated with memory usage in the heap. Finally, the analysis apparatus may use the first and second sets of inefficiency metrics to match one or more of the first set of objects to one or more of the second set of objects and use the result of the matching to identify a potential cause of the trend. The management apparatus may additionally output the trend and/or potential cause to further assist with identification and management of memory inefficiency in the software program.

In addition, one or more components of computer system 500 may be remotely located and connected to the other components over a network. Portions of the present embodiments (e.g., analysis apparatus, management apparatus, software program, etc.) may also be located on different nodes of a distributed system that implements the embodiments. For example, the present embodiments may be implemented using a cloud computing system that analyzes snapshots of heaps for a set of remote software programs for memory inefficiencies, trends, and/or issues in the software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a first snapshot of a heap for a software program, wherein the first snapshot comprises a first set of objects stored in the heap at a first time;
    applying, by a computer system, a compression technique to the first snapshot to obtain a first set of inefficiency metrics for the first set of objects, wherein each inefficiency metric in the first set of inefficiency metrics represents a memory inefficiency of an object in the heap at the first time;
    obtaining a second snapshot of the heap, wherein the second snapshot comprises a second set of objects stored in the heap at a second time;
    applying the compression technique to the second snapshot to obtain a second set of inefficiency metrics for the second set of objects;
    comparing the first and second sets of inefficiency metrics to identify a trend associated with memory usage in the heap; and
    outputting, by the computer system, one or more inefficiency metrics to improve identification of the memory inefficiency in the software program, wherein one or more of the first set of inefficiency metrics and the second set of inefficiency metrics are included in the outputted inefficiency metrics.

2. The method of claim 1, further comprising:
    grouping a subset of the first set of objects by an attribute;
    applying the compression technique to the grouped subset to obtain a group inefficiency metric for the grouped subset; and
    including the group inefficiency metric in the outputted set of inefficiency metrics.

3. The method of claim 2, wherein the attribute comprises at least one of:
    a type;
    a containment relationship;
    a size; and
    the inefficiency metric.

4. The method of claim 1, further comprising:
    using the first and second sets of inefficiency metrics to identify one or more matches between the first set of objects and the second set of objects; and
    using the one or more matches to identify a potential cause of the trend.

5. The method of claim 4, wherein the trend is associated with at least one of:
    a memory leak; and
    out-of-memory (OOM) error.

6. The method of claim 1, further comprising:
    matching the first snapshot and the first set of inefficiency metrics to a memory-usage pattern; and
    outputting a recommendation for reducing the memory inefficiency in the software program based on the memory-usage pattern.

7. The method of claim 6, further comprising:
    using the first and second sets of inefficiency metrics to determine an improvement in memory usage of the software program after the recommendation has been implemented.

8. The method of claim 1, wherein outputting the set of inefficiency metrics with the additional attributes of the first set of objects comprises at least one of:
    displaying a ranking of the first set of objects by the memory inefficiency; and
    identifying a subset of the first set of objects as candidates for improving the memory inefficiency.

9. The method of claim 1, wherein the set of inefficiency metrics comprises at least one of:
    a redundancy; and
    a compression ratio.

10. The method of claim 1, wherein the additional attributes comprise at least one of:
    a class name;
    an uncompressed size;
    a compressed size;
    a number of object instances;
    a field;
    a type; and
    a value.

11. An apparatus, comprising:
    one or more processors; and
    memory storing instructions that, when executed by the one or more processors, cause the apparatus to:
        obtain a first snapshot of a heap for a software program, wherein the first snapshot comprises a first set of objects stored in the heap at a first time;
        apply a compression technique to the first snapshot to obtain a first set of inefficiency metrics for the first set of objects, wherein each inefficiency metric in the first set of inefficiency metrics represents a memory inefficiency of an object in the heap at the first time;
        obtain a second snapshot of the heap, wherein the second snapshot comprises a second set of objects stored in the heap at a second time;
        apply the compression technique to the second snapshot to obtain a second set of inefficiency metrics for the second set of objects; and
        compare the first and second sets of inefficiency metrics to identify a trend associated with memory usage in the heap; and
        output one or more inefficiency metrics to improve identification of the memory inefficiency in the software program, wherein one or more of the first set of inefficiency metrics and the second set of inefficiency metrics are included in the outputted inefficiency metrics.

12. The apparatus of claim 11, wherein the memory further stores instructions that, when executed by the one or more processors, cause the apparatus to:
   group a subset of the first set of objects by an attribute;
   apply the compression technique to the grouped subset to obtain a group inefficiency metric for the grouped subset; and
   include the group inefficiency metric in the outputted set of inefficiency metrics.

13. The apparatus of claim 11, wherein the memory further stores instructions that, when executed by the one or more processors, cause the apparatus to:
   use the first and second sets of inefficiency metrics to identify one or more matches between the first set of objects and the second set of objects; and
   use the one or more matches to identify a potential cause of the trend.

14. The apparatus of claim 11, wherein the memory further stores instructions that, when executed by the one or more processors, cause the apparatus to:
   match the first snapshot and the first set of inefficiency metrics to a memory-usage pattern; and
   output a recommendation for reducing the memory inefficiency in the software program based on the memory-usage pattern.

15. The apparatus of claim 14, wherein the memory further stores instructions that, when executed by the one or more processors, cause the apparatus to:
   use the first and second sets of inefficiency metrics to determine an improvement in memory usage of the software program after the recommendation has been implemented.

16. The apparatus of claim 11, wherein outputting the set of inefficiency metrics with the additional attributes of the first set of objects comprises at least one of:
   displaying a ranking of the first set of objects by the memory inefficiency; and
   identifying a subset of the first set of objects as candidates for improving the memory inefficiency.

17. The apparatus of claim 11, wherein the set of inefficiency metrics comprises at least one of:
   a redundancy;
   a compression ratio; and
   a compressed size.

18. A system, comprising:
   an analysis module comprising a non-transitory computer-readable medium storing instructions that, when executed by one or more processors, cause the system to:
      obtain a first snapshot of a heap for a software program, wherein the first snapshot comprises a first set of objects stored in the heap at a first time;
      apply a compression technique to the first snapshot to obtain a first set of inefficiency metrics for the first set of objects, wherein each inefficiency metric in the first set of inefficiency metrics represents a memory inefficiency of an object in the heap at the first time;
      obtain a second snapshot of the heap, wherein the second snapshot comprises a second set of objects stored in the heap at a second time;
      apply the compression technique to the second snapshot to obtain a second set of inefficiency metrics for the second set of objects; and
      compare the first and second sets of inefficiency metrics to identify a trend associated with memory usage in the heap; and
   a management module comprising a non-transitory computer-readable medium storing instructions that, when executed by the one or more processors, cause the system to output one or more inefficiency metrics to improve identification of the memory inefficiency in the software program, wherein one or more of the first set of inefficiency metrics and the second set of inefficiency metrics are included in the outputted inefficiency metrics.

19. The system of claim 18, wherein the non-transitory computer-readable medium of the analysis module further stores instructions that, when executed by the one or more processors, cause the system to:
   use the first and second sets of inefficiency metrics to identify one or more matches between the first set of objects and the second set of objects; and
   use the one or more matches to identify a potential cause of the trend.

20. The system of claim 18, wherein the non-transitory computer-readable medium of the analysis module further stores instructions that, when executed by the one or more processors, cause the system to:
   match the first snapshot and the first set of inefficiency metrics to a memory-usage pattern;
   output a recommendation for reducing the memory inefficiency in the software program based on the memory-usage pattern; and
   use the first and second sets of inefficiency metrics to determine an improvement in memory usage of the software program after the recommendation has been implemented.

* * * * *